United States Patent [19]

Jahnke et al.

[11] Patent Number: 4,562,431

[45] Date of Patent: Dec. 31, 1985

[54] FUEL FILTER UNIT WITH WATER CONTENT INDICATOR

[75] Inventors: Horst Jahnke, Stuttgart; Brigitte Moro, Gerlingen; Erich Scholz, Neuhausen; Hans Siebke, Ditzingen, all of Fed. Rep. of Germany

[73] Assignee: Robert Bosch GmbH, Stuttgart, Fed. Rep. of Germany

[21] Appl. No.: 498,250

[22] Filed: May 26, 1983

[30] Foreign Application Priority Data

May 26, 1982 [DE] Fed. Rep. of Germany ....... 3219729

[51] Int. Cl.$^4$ ............................................. G08B 21/00
[52] U.S. Cl. ..................................... 340/604; 210/85; 210/96.1; 340/59
[58] Field of Search ............... 340/602, 603, 604, 620, 340/59; 210/86, 96.1, 85

[56] References Cited

U.S. PATENT DOCUMENTS 3,428,941 2/1969 Hewes ........................ 340/815.16 X
4,276,161 6/1981 Matsui et al. ........................ 210/86

FOREIGN PATENT DOCUMENTS 222939 7/1959 Australia ............................. 340/604

Primary Examiner—James L. Rowland
Assistant Examiner—Daniel Myer
Attorney, Agent, or Firm—Frishauf, Holtz, Goodman & Woodward

[57] ABSTRACT

Corrosion of a water sensor resulting from the passage of considerable electric current through it while it is in contact with water is prevented in a motor fuel filter equipped for water separation by interrupting or greatly reducing the current passing through the sensor after the sensor has given a signal indicating the presence of water in sufficient quantity to require draining soon. The warning provided to the vehicle driver is maintained thereafter either by a signal storage circuit (flip-flop) or by causing current diverted from the sensor to flow through a substitution resistor or a shunt transistor.

6 Claims, 4 Drawing Figures

FUEL FILTER UNIT WITH WATER CONTENT INDICATOR

This invention concerns a fuel filter unit, for example for gasoline or diesel fuel, in which a water sensor is provided to indicate when there is sufficient water collected there to make it appropriate to drain off the water as a protection against malfunction of an internal combustion engine.

U.S. Pat. No. 4,276,161, shows a filter for motor fuel at the bottom of which a sensor is built in. There is also provided an alarm device that responds as soon as the level of water in the filter exceeds a predetermined value. The user of the filter knows that the water should then be drained off.

That known device has the disadvantage, however, that the provision of the signal by the sensor requires a strong current through the sensor. In consequence heavy corrosion of the sensor point takes place which makes the sensor unusable within a short period of time. If the water is not drained promptly when it appears, the sensor must be replaced. There is also the further disadvantage that the corrosion products of the sensor element get into the motor fuel and can cause damage, for example in a fuel-injection pump.

It is an object of the present invention to provide a fuel filter unit equipped with a water-detecting sensor in such a way that continuing contact of the sensor with water, for example during operation of a motor vehicle, will not give rise to corrosion of the sensor and contamination of the fuel.

Briefly, means are provided, connected to the evaluation circuit which provides the sensor signal to an indicating device, for reducing to a low value the current therethrough once a signal has been produced by the sensor while maintaining the indication to the user that the water level has been reached at which the fuel filter should be drained of water.

In principle, once the evaluation circuit has caused the indicators to show a warning in response to the provision of a signal by the sensor, the current through the sensor can be switched off while the warning is maintained at the indicator. Maintaining the warning at the indicator may be done by substituting an equivalent resistor for the sensor in the evaluation circuit or by interposing a flipflop in the evaluation circuit. In accordance with the invention the current through the sensor is reduced by means of a shunt transistor which is put into its conducting condition by the evaluation circuit after the sensor produces its signal.

The reduced current consumption in the sensor reduces the corrosion of the sensor when it is in contact with water to a practically negligible value over a considerable service life and also reduces possible contamination of the fuel from any such corrosion.

The invention has the advantage that the sensor remains capable of performing its function within a limited range when the current through it is merely reduced, instead of switched off. The use of a shunt transistor lends itself well to use with any of a variety of sensors, since the conductivity of the transistor can be made to reach any value within a considerable range.

THE DRAWING

The invention is further described by way of illustrative examples with reference to the annexed drawings, in which.

DESCRIPTION OF THE ILLUSTRATED EMBODIMENTS

Figure 1:
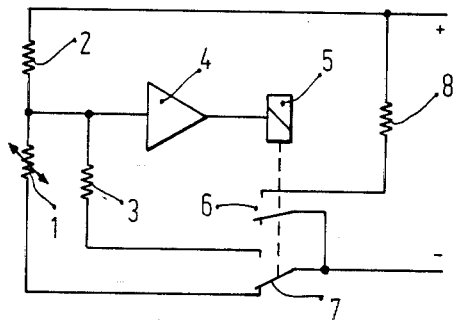
FIG. 1 is a circuit diagram of a first embodiment of the invention.

The sensor in the circuit of FIG. 1 is shown as the variable resistance 1, representing the fact that the resistance of the sensor drops to a lower value in the presence of water. One terminal of the sensor 1 is connected with the input of an amplifier 4, the other with one of the contacts of a transfer switch 7. Another resistance 2 is connected at the same input of the amplifier 4 and has its other end connected to the positive voltage supply. A third resistor 3 is connected from the input of the amplifier 4 over to another contact of the transfer switch 7. the arm contact of the switch 7 is connected to the negative voltage supply line.

The output of the amplifier 4 is connected to operate a relay 5. The relay 5 switches over the transfer switch 7 and the normally open switch 6, which has one of its contacts to the negative voltage supply line, which provides also a ground connection. The other contact of the normally open switch 6 is connected to a lamp 8 which has its other terminal connected to the positive voltage supply line.

The operation of the circuit just described is explained with reference to a sensor-equipped motor fuel filter which it serves. When the vehicle is started, there is a voltage of 3.4 V at the ungrounded terminal of the sensor 1, for example. If there is no water in the filter, no sensor current flows and the relay 5 remains dropped out. This is the condition shown in FIG. 1. The lamp 8 is dark.

If there is water in the sensor, a current flows through the sensor 1 because of the conductivity now provided. The voltage at the input of the amplifier 4 drops off and the relay 5 pulls in. In consequence the switches 6 and 7 are actuated. Through the former one side of the lamp 8 is connected to chassis ground, so that the lamp 8 lights up. The switch 7 operates to interrupt the current through the sensor 1 and to establish instead a current through the resistance 3, which now becomes connected to the negative voltage supply line. The sensor current flow is now simulated by the current flow through the resistance 3, which must therefore have a value corresponding to that which the sensor takes on when it is in its conducting condition. The relay 5 remains pulled in and the lamp 8 continues to shine, even though the sensor current is now interrupted. When the motor of the vehicle is shut off, the switches 6 and 7 go back to their initial position. When the vehicle is started again the voltage is again applied to the sensor 1. If the water has not yet been drained off, the events above described are repeated. The circuit arrangement has the advantage that the sensor is only briefly energized when there is water in the filter unit. As the result the sensor no longer needs to be regularly replaced from time to time. The maintainance expense is greatly reduced.

Figure 2:
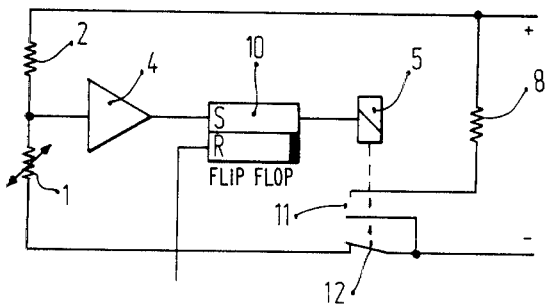
FIG. 2 is a circuit diagram of a second embodiment of the invention utilizing a flipflop.

FIG. 2 shows another illustrative embodiment of the invention. The sensor 1, again shown as a variable resistance, is now connected between the input of the amplifier 4 and a normally closed switch 12. The resistance 2 is again connected between the input of the amplifier 4 and the positive voltage supply line. The output of the amplifier 4 is in this case connected to the set input of a storage element which in this case is illustrated as a RS flipflop. The reset input of the RS flipflop 10 is, for example, connected with a signal line serving the ignition circuit of the vehicle motor. The output of the RS flipflop is connected to a relay 5 by which tne normally closed switch 12 and the normally open switch 11 can be operated. The lamp 8 is again connected between the positive voltage supply line and the fixed contact of the normally open switch, in this case the switch 11. Both of the switches 11 and 12 have one contact connected to the negative voltage supply line.

If now there is water in the filter unit, a current again flows in the sensor 1, causing the amplifier 4 to change its condition and provide an output, which, in turn, sets the RS flipflop 10. The relay operates and closes the contacts of the switch 11 while opening those of the switch 12. By the closing of the switch 11 the lamp 8 lights up, indicating to the driver that water should be drained out of the filter. By the opening of the switch 12 the current through the sensor 1 is interrupted. The reset input is actuated, for example, when the motor starts. It is therefore connected to an ignition voltage line. After the setting of the flipflop 10 a lasting indication is provided at the indicator lamp 8, even if the current through the sensor 1 is already interrupted. The switches 11 and 12 are simple switches, so that these can also be constituted as transistor switches. In this case the output signal of the flipflop 10 is usable directly for control of the transistor switch for the contact 11 and indirectly, through an inverter stage, for control of the transistor switch corresponding to the switch 12.

In FIG. 3 the water sensor is again designated 1. The sensor is connected at one end with the negative voltage supply line and at the other end with the collector of a transistor 22 and a resistance 20. The positive voltage supply line leads on the one hand to a lamp 8 and on the other hand to a diode 15. The cathode of the diode 15 is on one hand connected through the parallel connection of a resistance 16 with a capacitor 17 over to the negative voltage supply line, while on the other side a capacitor 18 is interposed as a connection over to the collector of the transistor 22, where it also connects to the sensor 1 and to the resistor 20 which leads to the base of a transistor 23 and also to a resistor 19 that leads to the cathode of the diode 15, which has its anode connected to the positive voltage supply line. The latter is also connected to a lamp 8. The parallel combination of a capacitor 17 and a resistance 16 is connected between the cathode of the diode 15 and the negative voltage supply line. The capacitor 18 is connected between the cathode of the diode 15 and the common connection point of the sensor 1, the resistor 20 and the collector of the transistor 22. The emitter of the transistor 23 is connected to the cathode of the diode 15, while its collector is connected through resistance 21 to the base of the transistor 22 as well as through a resistance 24 to the base of the transistor 27, where a resistance 25 is connected to provide a path to the negative voltage supply line.

The emitter of the transistor 27 is connected through a resistance 26 to the negative voltage supply line. The lamp 8 and also a parallel combination of a capacitor 28 and a resistance 29 are connected to the collector of the transistor 27. The respective other terminals of the capacitor 28 and the resistance 29 are connected to the negative voltage supply line.

In the case of this circuit, the transistors 22, 23, and 27 and blocked in the normal state, i.e. when the water level in the filter unit has not yet reached the sensor. The indicator lamp 8 is dark. If now the water rises in the filter unit and touches the sensor, a current flows through the sensor. The base of the transistor 23 then receives a negative potential and turns on the transistor 27, so that the lamp 8 lights up. At the same time the transistor 22 is made conducting, applying its controlled path, namely its collector-emitter path, in parallel to the sensor 1. When the transistor 22 conducts it shunts down the sensor 1 and relieves it of most of its current load that now flows through the collector-to-emitter path of the transistor 22. Only a very slight current flows through the sensor itself now, this small current depending essentially on the voltage drop in the collector-emitter path of the transistor 22.

The above-described system also provides a longer service life for sensor, since the removal of the material by electrolysis in the case of the slight current that still flows is very small. On the other hand, the initial current through the sensor 1 can be made very large, so that the circuit is sure to respond.

Figure 4:
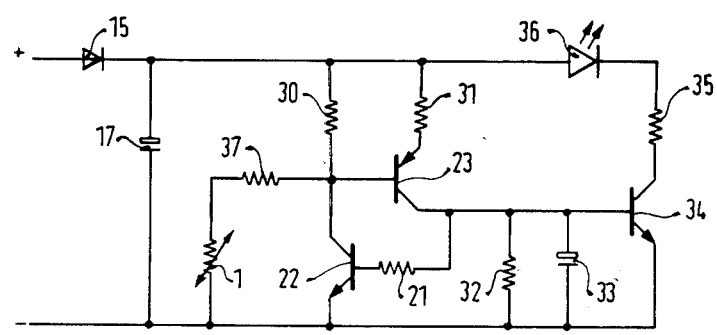
FIG. 4 is a circuit diagram of a fourth embodiment of the invention utilizing a light-emitting diode (LED) as the warning indicator.

FIG. 4 shows a particularly simple circuit for indication of the water level in the filter unit. A diode 15 has its anode connected to the positive voltage supply terminal and its cathode to a capacitor 16, the other terminal of which is connected to the negative voltage supply terminal and line. the sensor 1 is connected at one end to the negative voltage supply line and at the other through a resistance 33 to the collector of the transistor 22. The emitter of the transistor 22 is connected to the negative voltage supply line. The collector of the transistor 22 is also connected through a resistance 30 to the cathode of the diode 15 and also to the base of the transistor 23. The base of the transistor 22 is connected through a resistance 21 to the collector of the transistor 23. The emitter of the transistor 23 is connected through a resistance 31 with the cathode of the diode 15. The collector of the transistor 23 is connected to the base of still another transistor 34. Furthermore, the parallel connection of a resistance 32 and a capacitor 33 leads from the collector of the transistor 23 and the base of the transistor 34 to the negative voltage supply line, to which the emitter of the transistor 34 is also connected. The collector of the latter transistor is connected through a series circuit composed of a resistance 35 and a light-emitting diode (LED) 36 with the cathode of the diode 15. Instead of the LED 36 a lamp could be used, provided that the resistance 35 is correspondingly dimensioned.

Figure 3:
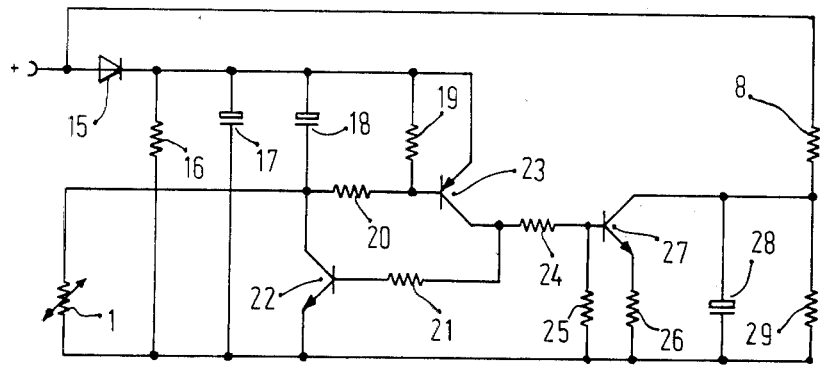
FIG. 3 is a circuit diagram of a third embodiment of the invention utilizing a shunt transistor.

The manner of operation of the circuit just described corresponds to that of the circuit of FIG. 3. In the normal state, i.e. when the water level has not yet reached the sensor 1, the transistors 22, 23 and 34 are blocked. The LED 36 does not shine. If now the water rises and touches the sensor 1, a current flows through the sensor. In consequence the base of the transistor 23 receives a negative potential and switches the latter transistor on. This then turns on the transistor 34 and the LED lights. At the same time the transistor 22 is made conducting. The latter has its collector-emitter path parallel to the sensor 1. The transistor 22 in its conducting condition accordingly takes over most of the current from the sensor 21. This circuit has the advantage that it is insensitive to false connections and requires only a few components.

The several circuits shown by way of illustration here are suited exceptionally well for indicating the maximum permissible water level in chambers for separating water from gasoline or diesel fuel. The circuits are not limited to vehicular use and can be applied to water separators in the fuel line of oil burners or the like.

Although the invention has been described with reference to particular illustrative examples, it will be recognized that variations and modifications are possible within the inventive concept.

We claim:

1. Fuel filter unit equipped for detection of water in the filter unit, comprising a water sensor (1) for providing a signal when water in said filter unit reaches a predetermined quantity or level, an evaluation circuit including an indicator (8, 36) for producing a warning in response to appearance of said signal and circuit means connected to said evaluation circuit for reduction of the current in said sensor after appearance of said signal without substantially affecting the output of said evaluation circuit which is provided to said indicator (8, 36), said circuit means including a first transistor (22) having its controlled path connected in parallel to said sensor (1) and its control electrode connected in circuit for causing said transistor to become conductive during the provision of said output of said indicator.

2. Filter unit according to claim 1 wherein said evaluation circuit includes a second transistor (23) connected so as to respond to detection of water by said sensor and having an output circuit, said first transistor (22) of said circuit means having its control electrode connected to the output circuit of said second transistor (23), and also a third transistor (27, 34) having its controlled path in circuit with said indicator (8, 36) and its control electrode connected for response to said output circuit of said second transistor (23).

3. Filter unit according to claim 2 wherein said indicator is a light emitting diode (36) and said second transistor (23) is of a conductivity type complementary to the conductivity types of said first and third transistors (22, 34).

4. Filter unit according to claim 3 in which a capacitance (33) and a resistance (32) are connected between the the control electrode of said third transistor and a circuit point of fixed potential to which an electrode of each of said first and third transistors are connected.

5. Filter unit according to claim 2 wherein said indicator is a lamp (8) and said second transistor (23) is of a conductivity type complementary to the conductivity types of said first and third transistors (22, 27).

6. Filter unit according to claim 5 in which a capacitor and a resistor are connected in parallel between the connection in said evaluation circuit at which said third transistor (27) is connected to said indicator (8) and a circuit point at reference potential to which one terminal of said sensor and one electrode of said first transistor are connected and wherein said first and second transistors and said sensor are supplied by energizing potential which is made independent of the potential applied to said lamp and said third transistor by means of a diode (15), a resistor-capacitor filter (16, 17) being provided to stabilize said independent potential and a capacitance (18) being provided between said independent energizing potential and a terminal connection of said sensor.

* * * * *